(12) United States Patent
Classen et al.

(10) Patent No.: US 11,174,886 B2
(45) Date of Patent: Nov. 16, 2021

(54) FASTENING SYSTEM

(71) Applicant: ILLINOIS TOOL WORKS INC., Glenview, IL (US)

(72) Inventors: Roland Classen, Roetgen (DE); Thiemo Ammann, Rockenhausen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 155 days.

(21) Appl. No.: 16/180,522

(22) Filed: Nov. 5, 2018

(65) Prior Publication Data

US 2019/0136896 A1 May 9, 2019

(30) Foreign Application Priority Data

Nov. 6, 2017 (DE) ..................... 10 2017 125 796.9

(51) Int. Cl.
*F16B 21/10* (2006.01)
*F16B 13/08* (2006.01)
*F16B 21/08* (2006.01)
*F16B 5/06* (2006.01)
*F16B 2/20* (2006.01)
*F16B 2/24* (2006.01)

(52) U.S. Cl.
CPC ................ *F16B 21/10* (2013.01); *F16B 2/20* (2013.01); *F16B 2/243* (2013.01); *F16B 5/0607* (2013.01); *F16B 13/0841* (2013.01); *F16B 21/086* (2013.01)

(58) Field of Classification Search
CPC ...... F16B 21/10; F16B 21/086; F16B 21/065; F16B 21/075; F16B 13/0841; F16B 13/045; F16B 13/126; F16B 2/20; F16B 2/243; F16B 5/0607; F16L 3/233
See application file for complete search history.

(56) References Cited

U.S. PATENT DOCUMENTS 3,417,438 A * 12/1968 Schuplin ............. F16B 19/1081
411/41
6,074,150 A * 6/2000 Shinozaki ........... B60R 13/0206
24/297

(Continued)

FOREIGN PATENT DOCUMENTS

DE 102014115186 2/2016
DE 102015106223 A1 10/2016

*Primary Examiner* — Victor D Batson
*Assistant Examiner* — Amit Singh Dhillon
(74) *Attorney, Agent, or Firm* — Thompson Hine LLP

(57) ABSTRACT

A fastening system for fastening in a receptacle of a carrier component includes a fastening element with a guide portion insertable into the receptacle along a direction of insertion, and a clip element which is plugged onto the guide portion and which, to hold the fastening element and clip element in the receptacle, has retaining edges which interact with an inner surface of the receptacle, wherein the guide portion and clip element have interacting latching portions formed in such a way that an axial pulling force to release the fastening element and clip element from the receptacle produces a radially outwardly acting force on the retaining edges of the clip element, wherein the fastening element and the clip element further have interacting stop portions which counteract release of the clip element from the fastening element.

17 Claims, 4 Drawing Sheets

(56) References Cited

U.S. PATENT DOCUMENTS

| | | | |
|---|---|---|---|
| 7,401,388 B2* | 7/2008 | Hansen | F16B 5/0614 |
| | | | 24/292 |
| 7,461,436 B2* | 12/2008 | Asano | B60R 13/0206 |
| | | | 24/297 |
| 9,631,657 B2 | 4/2017 | Zajak | |
| 9,850,934 B2* | 12/2017 | Schulz | F16B 21/086 |
| 10,348,076 B2 | 7/2019 | Gallion | |
| 2005/0242247 A1* | 11/2005 | Geiger | F16L 3/2332 |
| | | | 248/74.3 |
| 2011/0203081 A1* | 8/2011 | Iwahara | F16B 19/1081 |
| | | | 24/458 |
| 2016/0108946 A1 | 4/2016 | Zajak | |
| 2016/0356298 A1* | 12/2016 | Pquet | E05C 19/06 |
| 2017/0059060 A1* | 3/2017 | Gallion | H02G 3/32 |
| 2017/0349117 A1* | 12/2017 | Mingerink | F16B 2/22 |
| 2018/0112699 A1* | 4/2018 | Ligi, Jr. | F16B 21/086 |
| 2018/0148003 A1 | 5/2018 | Hübner | |

* cited by examiner

FASTENING SYSTEM

TECHNICAL FIELD

The invention relates to a fastening system for fastening in a receptacle of a carrier component, comprising a fastening element with a guide portion which can be inserted into the receptacle along a direction of insertion, and comprising a clip element which is plugged onto the guide portion and which, to hold the fastening element and clip element in the receptacle, has retaining edges which interact with an inner surface of the receptacle, wherein the guide portion and clip element have interacting latching portions by means of which the clip element is held against the guide portion in a latching manner, and wherein the latching portions are formed in such a way that an axial pulling force to release the fastening element and clip element from the receptacle produces a radially outwardly acting force on the retaining edges of the clip element.

BACKGROUND

Such a fastening system is known from DE 10 2014 115 186 B3. In the case of this fastening system, outer edges of a clamping tab are inclined in such a way the clamping tab produces a type of thread effect by means of which the fastening element can be unscrewed from a receptacle. In this way, it is possible to achieve simple demounting combined at the same time with high retaining forces in particular of the clamping tab in the receptacle. Upon exertion of an axial pulling force on the fastening system for release from the receptacle, interacting spreading surfaces of the clamping tab and a guide body lead to the clamping tab spreading out and consequently the outer edges of the clamping tab digging into an inner surface of the receptacle.

However, in the case of the known fastening system, when exceeding a defined pulling-out force, there can occur a release of the guide body from the clamping tab and a resultant extraction of the guide body from the receptacle with the clamping tab remaining in the receptacle. This in turn makes it considerably more difficult to subsequently release the clamping tab from the receptacle. Even in the state in which the system is not yet mounted in the receptacle, the interacting spreading surfaces do not always offer sufficient captive securement for the clamping tab (re-mounted on the guide body. Therefore, in the course of delivery of the premounted fastening system, for example, there can occur undesired release of the clamping tab from the guide body, which correspondingly leads to further effort and expenditure with regard to mounting.

SUMMARY

Proceeding from the explained prior art, the object on which the invention is based is to provide a fastening system of the type stated at the outset which offers improved captive securement for the clip element premounted on the fastening element combined with likewise increased securement against axial extraction particularly of the fastening element from the receptacle.

The invention achieves the object by means of the subject matter of claim 1. Advantageous developments can be found in the dependent claims, the description and the figures.

For a fastening system of the type stated at the outset, the invention achieves the object in that the fastening element and clip element further have interacting stop portions which counteract release of the clip element from the fastening element. Here, the stop portions can in particular also increase the forces which act radially outward upon exertion of a pulling force.

The carrier component having the receptacle can be a carrier component of a vehicle, such as of a passenger car or truck. For example, the carrier component can be a body part of a vehicle. One or more objects can be held on the carrier component via the fastening system fastened in the receptacle and hence on the carrier component. For this purpose, the fastening element can have a retaining portion for holding one or more objects. The objects can be, for example, lines (electrical lines or liquid-conducting lines), cladding parts or other components for example of a vehicle, such as a passenger car or a truck.

The fastening system according to the invention has a fastening element and a clip element, these being two separate components. The clip element is mounted, in particular plugged, onto the fastening element, and the fastening element, together with the clip element, is inserted into the receptacle of the carrier component in a direction of insertion. Here, the direction of insertion corresponds in particular to the axial direction of the receptacle or to the longitudinal axis of the guide portion. The clip element can in particular be held releasably on the fastening element. The receptacle in particular forms a blind hole. The receptacle can be formed by a bore or be formed for example using a casting process. The receptacle does not need (before the first mounting or demounting of the fastening system) to have in particular an internal thread and a latching structure. This is not required according to the invention. In the simplest case, the receptacle can be a cylindrical receptacle with smooth inner walls. It is thus possible to obtain simple mounting of the fastening system by axial insertion into the receptacle. However, it would of course also be conceivable for the receptacle to have an internal thread and/or a latching structure. For retention in the receptacle, the clip element has retaining edges which, in the inserted state in the receptacle, interact with an inner surface of the receptacle and thus retain the clip element, and with this the fastening element, in the receptacle. The guide portion of the fastening element and the clip element have interacting latching portions by means of which the clip element is held against the guide portion in a latching manner. However, the latching portions are formed in such a way that an axial pulling force to release the fastening element and clip element from the receptacle leads to an outwardly directed force on the retaining edges of the clip element, which force presses the retaining edges (further) into the inner surface of the receptacle. In this way, the retaining force of the clip element in the receptacle is increased. According to the invention, the fastening element and clip element further have interacting stop portions which counteract release of the clip element from the fastening element. These stop portions provided in addition to the latching portions ensure that the fastening element is not released from the clip element even under high pull-out forces. Extraction of the fastening element from the receptacle without the clip element is reliably avoided. Moreover, the stop portions represent a reliable captive securement for the clip element plugged onto the fastening element, for example in a premounting position. Undesired release of the clip element from the fastening element prior to mounting in the receptacle is thus likewise reliably avoided.

A reliable captive securement is realized and at the same time the maximum pull-out force is considerably increased by the combination of the latching portions and the stop portions. Whereas known fastening systems of this type withstand a pull-out force from the receptacle up to approximately 150N before the fastening element is released from the clip element, it is possible according to the invention for pull-out forces of more than 350N to be realized, in the extreme case up to the destruction of the elements of the fastening system.

The clip element can be held in an axially moveable manner on the guide portion of the fastening element. The axial movability can be limited by the interacting stop means on the one hand and a bearing contact, for example of a connecting portion connecting two clip legs of the clip element, against the free end, which is to be inserted into the receptacle, of the guide portion on the other hand.

According to one embodiment, the fastening element can have, as latching portions, at least two ramp surfaces which are formed on opposite outer surfaces of the guide portion and which each extend obliquely outward as seen in the direction of insertion into the receptacle. The ramp surfaces extend in particular outward in opposite directions as seen in the direction of insertion. They jointly form an outwardly widening geometry as seen in the direction of insertion. For example, two such ramp surfaces can be formed on each of the two mutually opposite sides of the guide portion. A stop portion, for example a stop surface, can be situated between the ramp surfaces.

As mentioned, the direction of insertion extends in the direction of the longitudinal axis of the guide portion. Where mention is made in this context to "as seen in the direction of insertion into the receptacle", this thus refers to the longitudinal axis of the guide portion, in the direction of insertion into the receptacle. For example, the statement "as seen in the direction of insertion" thus refers to the longitudinal axis of the guide portion, in the direction from a head portion of the fastening element to the free end of the guide portion that is to be inserted into the receptacle. Where mention is made in this context to "as seen counter to the direction of insertion into the receptacle", this correspondingly refers to the longitudinal axis of the guide portion, counter to the direction of insertion into the receptacle. For example, the statement "as seen counter to the direction of insertion" thus refers to the longitudinal axis of the guide portion, in the direction from the free end of the guide portion that is to be inserted into the receptacle to a head portion of the fastening element. Where reference is made in the above context to the clip element, this refers to the mounted state on the fastening element.

According to a further embodiment, the clip element can have at least two clip legs which are connected to one another by a connecting portion and of which the free ends form the retaining edges. The connecting portion, together with the clip legs, can form a U shape. Here, the free ends are the ends of the clip legs that face away from the connecting portion. The connecting portion can extend substantially perpendicularly to two lateral legs of the clip legs. The lateral legs can be adjoined by the free ends of the clip legs. Where appropriate, ramp portions of the clip legs can be provided between the free ends and the lateral legs, as explained in more detail below. The free ends and/or the ramp portions and/or the lateral legs can be elastic. The connecting portion can also be elastic.

According to a further embodiment, the free ends of the clip legs can extend obliquely outward as seen counter to the direction of insertion into the receptacle. They extend in particular outward in opposite directions as seen counter to the direction of insertion. They thus together form an outwardly widening geometry as seen counter to the direction of insertion. With the clip element mounted on the fastening element, the cross section formed by the free ends, in particular the retaining edges thereof, is greater than the cross section of the receptacle. Upon insertion into the receptacle, the free ends are at first deformed elastically inward. Then, by virtue of their oblique orientation and their preloading produced during insertion, the retaining edges dig into the receptacle of the carrier component. As a result, they effectively counteract axial extraction from the receptacle.

According to a further embodiment, the retaining edges can each extend obliquely to a plane which is perpendicular to a longitudinal axis of the guide portion. Here, the obliqueness of the retaining edges is in particular such that the clip element produces, by way of the retaining edges, a type of thread effect by which the fastening system according to the invention can be unscrewed from the receptacle. A force counteracting the direction of insertion can be applied to the guide element via the clamping force acting by the retaining edges on the inner surface of the receptacle by rotating the fastening element together with the clip element preferably held thereon in a rotationally fixed manner about the longitudinal axis of the fastening element or of the guide portion. Here, the rotation about the longitudinal axis must occur in that direction in which the obliqueness of the retaining edges of the clip element produces a winding counter to the direction of insertion of the guide element. The rotation then leads to the clip element, and hence the fastening element, being rotated out of the receptacle. In this way, it is possible in a simple manner to achieve a destruction-free demounting of the fastening element, as is described in principle in DE 10 2014 115 186 B3.

Particularly for rotationally fixed mounting on the fastening element, the clip legs can each be received between two wall portions of the guide portion, in particular be received in a form-fitting manner. Lateral guidance or lateral retention of the clip legs is also achieved thereby. A retaining action by the latching portions or the stop portions is obtained in the axial direction.

According to a further embodiment in this respect, there can be provision that the clip legs have, as latching portions, in each case at least one ramp portion which is arranged between the free end of said clip legs and the connecting portion and extends obliquely outward as seen in the direction of insertion into the receptacle, wherein the ramp portions of the clip legs interact with the ramp surfaces of the guide portion. The ramp portions can each adjoin the obliquely extending free ends in the direction of the connecting portion. For example, each clip leg can have two ramp portions. The ramp surfaces of the guide portion form spreading surfaces which, with the fastening element and clip element inserted into the receptacle, by interacting with the ramp portions, spread apart the clip legs of the clip element upon exertion of a pulling force counter to the direction of insertion into the receptacle, with the result that in turn the retaining edges dig further into the inner surface of the receptacle and thus effectively counteract axial extraction of the clip element from the receptacle. As explained, there is a certain axial movability of the fastening element relative to the clip element. Since the retaining edges of the clip element dig into the inner surface of the receptacle, there initially occurs, upon exertion of a pulling force, a slight axial extraction of the fastening element or of its guide portion from the clip element. As a result, the ramp surfaces interact with the ramp portions, and the clip element is spread out. At the same time, the ramp surfaces counteract complete extraction of the fastening element from the clip element up to a limit pull-out force. There can be provision here that the ramp surfaces come into contact with the ramp portions only through the slight axial extraction of the fastening element or of its guide portion from the clip element. Upon a further exertion of the pulling force, the clip legs of the clip element are then spread out.

The clip legs of the clip element can comprise, as stop portions, in each case at least one stop projection which extends in the direction of the connecting portion. The guide portion can then have at least one stop surface with which the stop projections of the clip legs interact. Furthermore the stop projections can extend starting from the ramp portions of the clip legs or starting from the free ends or starting from a portion arranged in each case between the free ends and the ramp portions or starting from lateral legs of the clip legs. The stop projections can in particular be stop fingers. They project in the direction of insertion. This ensures an optimal effect against release of the clip element from the fastening element and a maximum increase of the retaining force of the fastening system in the receptacle. The stop projections are attached, for example, to the ramp portion of the clip legs. For example, they can be stamped out and bent out, within a stamping and bending process, from a portion of the clip legs which forms the ramp portions.

The at least one stop surface can lie in a plane which is substantially perpendicular to the longitudinal axis of the guide portion. The stop projections come into bearing contact with the at least one stop surface for an abutment. The orientation of the at least one stop surface in a plane lying perpendicular to the longitudinal axis of the guide portion or the direction of insertion leads to a particularly secure abutment.

There can furthermore be provision that the clip element is held in an axially movable manner on the guide portion, wherein, upon exertion of an axial pulling force, at first the interacting latching portions come into engagement with one another before the interacting stop portions come into engagement with one another. There can in particular be provision that the stop surface is offset with respect to the ramp surfaces in the longitudinal direction of the guide portion, namely is situated behind the ramp surfaces as seen in the direction of insertion. The stop surface is thus situated closer to the free end of the guide portion than the ramp surfaces. At first, the ramps counteract axial extraction. It is only when they have reached their maximum retaining force against extraction that the stop portions come into engagement with one another and perform retention against axial extraction. An optimum increase of the pull-out forces is thus realized. As already explained, the pull-out forces can be so high that the fastening system can be extracted from the receptacle only by destroying the fastening element.

According to a further embodiment, the fastening element can have, adjoining the guide portion, a head portion with a retaining portion for retaining at least one object to be fastened on the carrier component. The head portion can have an engagement portion for the engagement of a tool for mounting and/or demounting the fastening system. The head portion can also have a preferably elastic bearing portion which, with the guide portion completely inserted into the receptacle, comes to bear on an upper side of the carrier component.

The fastening element can consist of a plastic. It can be produced, for example, in a plastic injection-molding process. The fastening element can be formed in one piece.

The clip element can consist of metal material. For example, the clip element can be a metal stamped and bent part. The metal material in question is, for example, spring steel. The clip element can be formed in one piece.

The invention also relates to a fastening system according to the invention in the inserted state in the receptacle. Furthermore, the invention also relates to a fastening system according to the invention in the inserted state in the receptacle and with at least one object held on the fastening element.

BRIEF DESCRIPTION OF THE DRAWINGS

An exemplary embodiment is explained in more detail below with reference to figures, in which schematically.

Unless indicated otherwise, identical reference signs in the figures designate identical objects.

DETAILED DESCRIPTION

Figure 1:
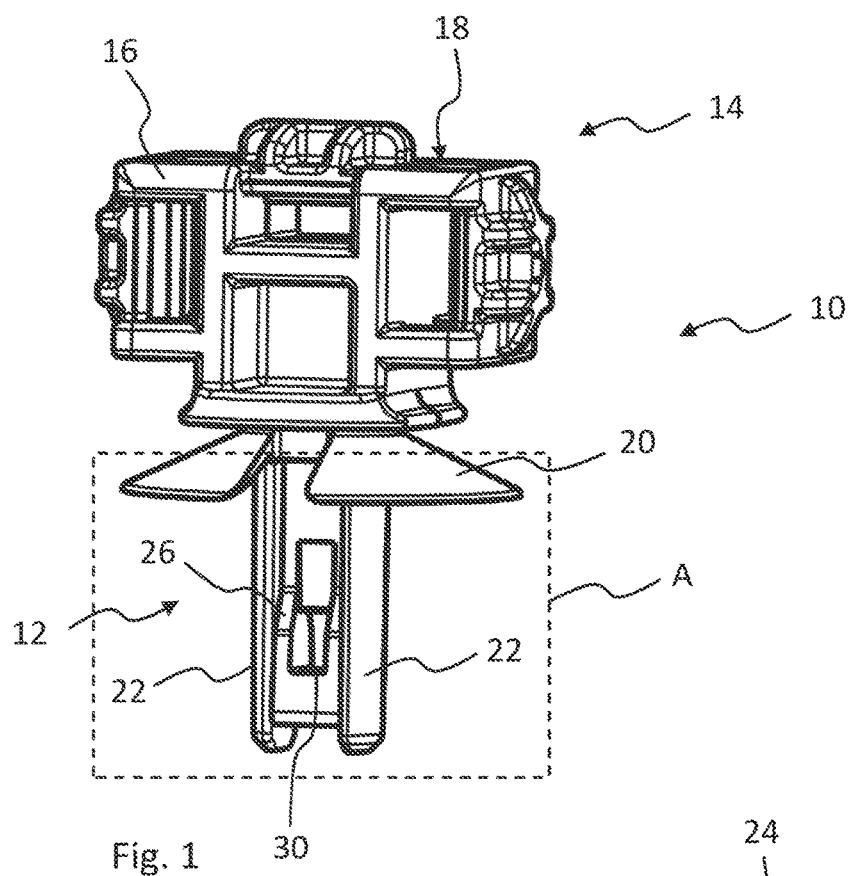
FIG. 1 shows a fastening element of a fastening system according to the invention in a perspective view.
Figure 2:
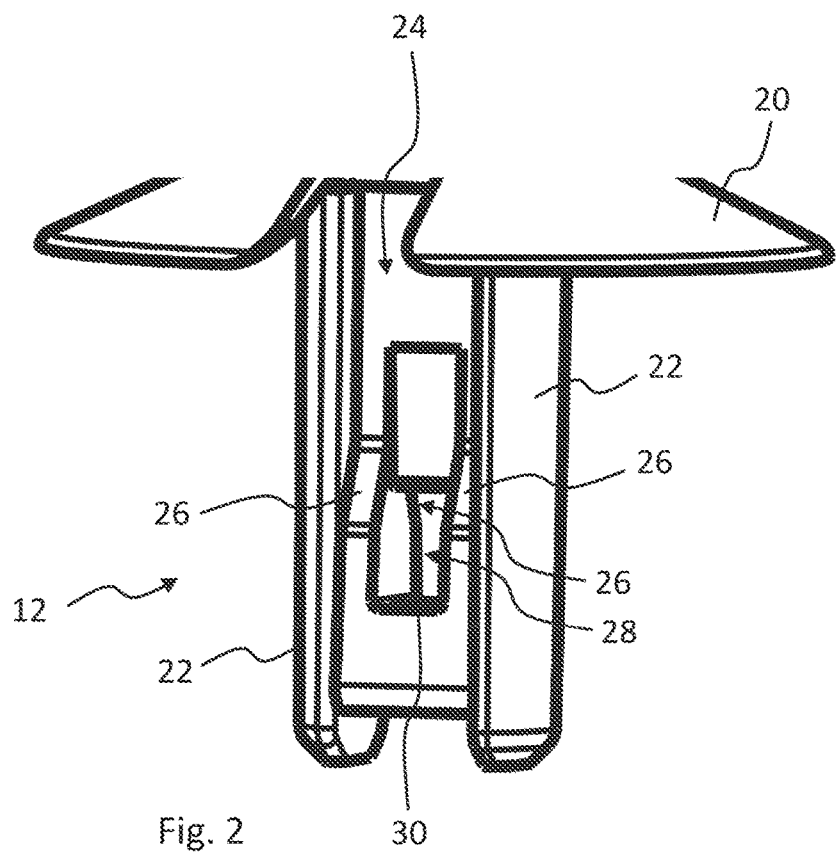
FIG. 2 shows the detail A from FIG. 1 in an enlarged illustration.

The fastening element 10 shown in FIGS. 1 and 2 has an elongate guide portion 12 and a head portion 14. The head portion 14 has a retaining portion 16 on which objects, such as lines, can be held. For this purpose, the retaining portion 16 has, in a manner known per se, a plurality of through-openings 18 through which a line to be held can be pulled. The head portion 14 additionally has an elastic bearing portion 20. The guide portion 12, the longitudinal axis of which extends in the vertical direction in FIGS. 1 and 2, can be inserted into a receptacle of a carrier component in a direction of insertion, vertically from top to bottom in FIGS. 1 and 2. In the inserted state in the receptacle, the bearing portion 20 bears on an upper side of the carrier component. In the present case, the fastening element 10 is formed in one piece and consists of a plastic. It can be produced, for example, in a plastic injection-molding process.

The design of the guide portion 12 is to be explained in more detail by means of the illustration of FIG. 2 which is enlarged in the form of a detail. The guide portion 12 has two mutually opposite wall portions 22 which between them delimit a recess 24 for the clip element shown in FIGS. 3 to 5. In addition, in each case two ramp surfaces 26 are formed between the wall portions 22 on two opposite sides, of which the one side (rear side) is concealed in FIGS. 1 and 2. The ramp surfaces 26 each extend obliquely outward as seen in the direction of insertion into the receptacle, that is to say as seen in the downward direction in FIG. 2. Between the ramp surfaces 26 there is formed a cutout 28 which is continuous in the example shown and the underside of which forms a stop surface 30. FIGS. 1 and 2 clearly show that the stop surface 30 is offset with respect to the ramp surfaces 26, namely is situated closer to the free end of the guide portion 12, i.e. the lower end of the guide portion 12 in FIGS. 1 and 2, than the ramp surfaces 26. In addition, the stop surface 30 lies in a plane which is situated perpendicular to the longitudinal axis of the guide portion 12.

Figure 3:
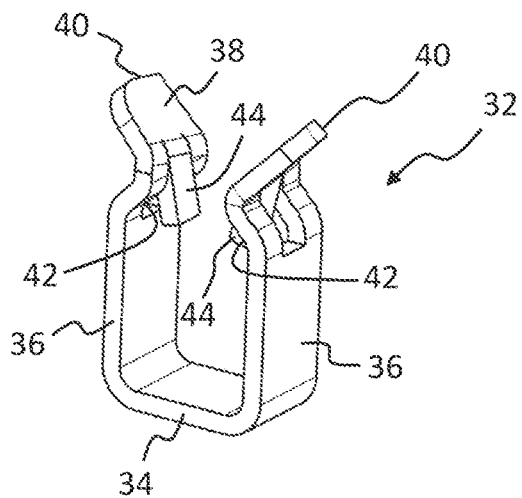
FIG. 3 shows a clip element of the fastening system according to the invention in a perspective view.
Figure 4:
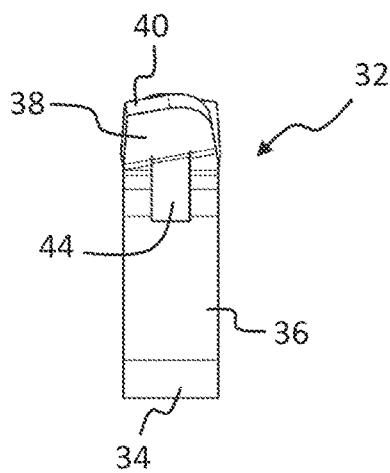
FIG. 4 shows the clip element from FIG. 3 in a side view.
Figure 5:
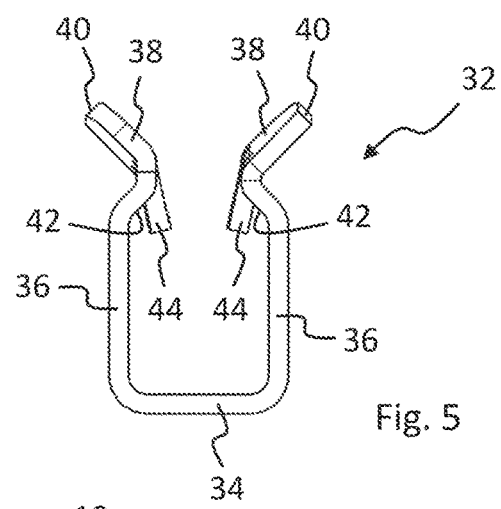
FIG. 5 shows the clip element from FIG. 3 in a front view.

FIGS. 3 to 5 show a clip element 32 of the fastening system according to the invention. In the example represented, the clip element 32 consists of a metal material, for example a spring steel, and is formed in one piece. It can be a metal stamped and bent part, for example. The clip element 32 has a connecting portion 34 which connects two lateral legs 36 to one another. The connecting portion 34 and the lateral legs 36 form a U profile. The lateral legs 36 are part of two clip legs of the clip element 32, the free ends 38 of which form retaining edges 40. The free ends 38 of the clip legs extend obliquely outward as seen counter to the direction of insertion of the premounted fastening system shown in FIG. 6 into the receptacle, that is to say as seen vertically from bottom to top in FIG. 5. In addition, it can be seen in FIG. 4 for example that the retaining edges 40 each extend obliquely to a plane which, in the premounted state on the fastening element 10, is situated perpendicular to the longitudinal axis of the guide portion 12. In the example represented, the clip legs of the clip element 32 additionally each have two ramp portions 42 between the lateral legs 36 and the free ends 38. The ramp portions 42 extend obliquely outward as seen in the direction of insertion into the receptacle, that is to say as seen vertically from top to bottom in FIG. 5. They interact with the ramp surfaces 26 of the guide portion 12, as will be explained in more detail below. The clip legs of the clip element 32 each additionally have a stop projection 44 which extends, starting from the transition between the free ends 38 and the ramp portions 42, in the direction of the connecting portion 34. The stop projections 44 are of elongate design and form stop fingers. As already explained, the stop projections could also be arranged on the lateral legs 36.

Figure 6:
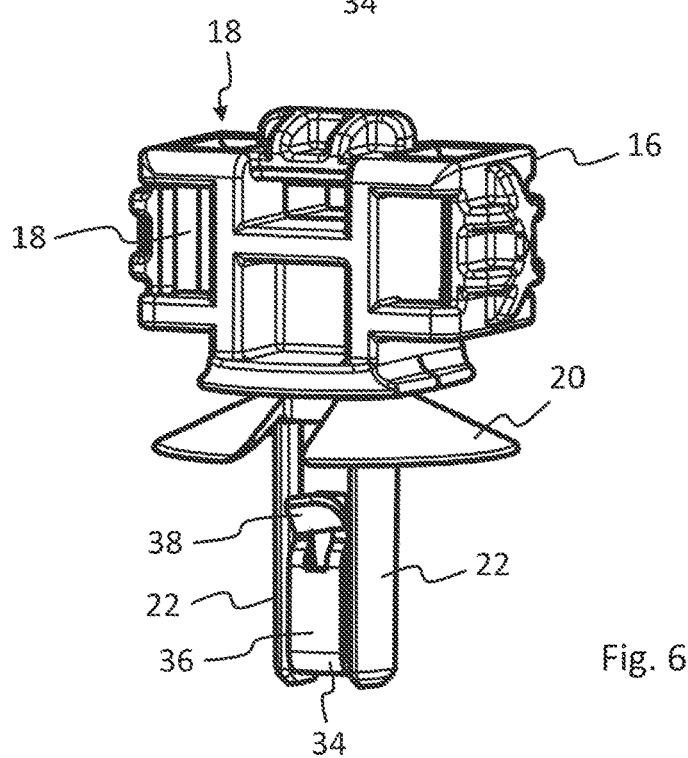
FIG. 6 shows the clip element shown in FIG. 3 in the mounted state on the fastening element shown in FIG. 1, in a perspective view.
Figure 7:
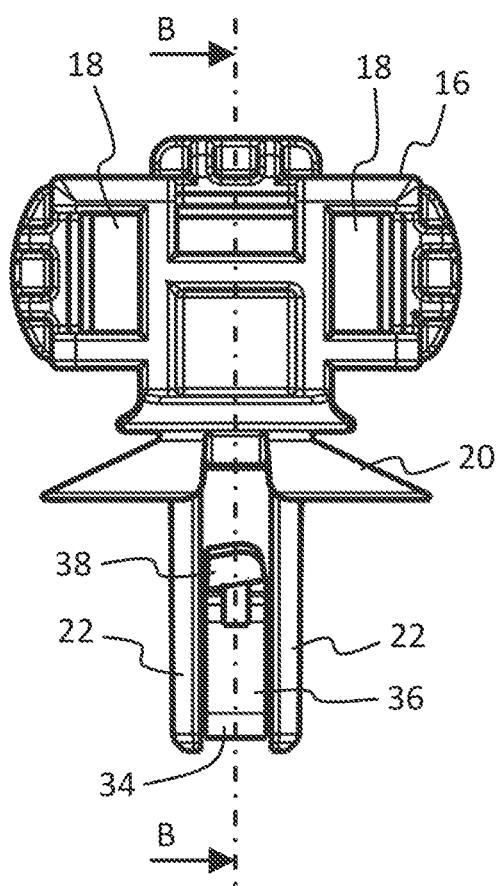
FIG. 7 shows the illustration from FIG. 6 in a front view.
Figure 8:
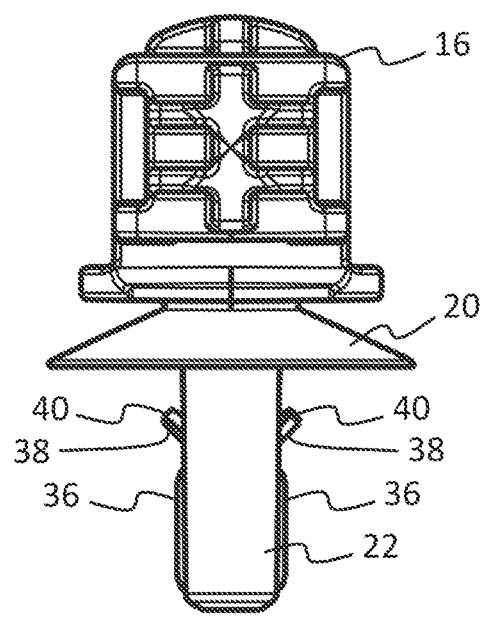
FIG. 8 shows the illustration from FIG. 6 in a side view rotated through 90° with respect to FIG. 7.

FIGS. 6 to 8 show the state of the clip element 32 in which it is premounted on the fastening element 10. To achieve this state, the clip element 32 is plugged onto the free end of the guide portion 12, the portion formed from the free ends 38 and the ramp portions 42 and the lateral legs 36 of the clip legs of the clip element 32 each at first being pressed elastically outward and then being deformed back again in the direction of their rest position, the ramp surfaces 26 and the associated ramp portions 42 forming a latching connection, and the stop projections 44 being received in the clearance 28 of the guide portion 12. The interacting ramp surfaces 26 and ramp portions 42 prevent release of the clip element 32 from the guide portion 12 up to a certain pull-out force. Above this pull-out force, the stop projections 44 then come into bearing contact with the stop surface 30 and thus reliably prevent release of the clip element 32 from the guide portion 12 and hence the fastening element 10. In the premounted state shown in FIGS. 6 to 8, the fastening system can be delivered to an assembly site, for example.

Figure 9:
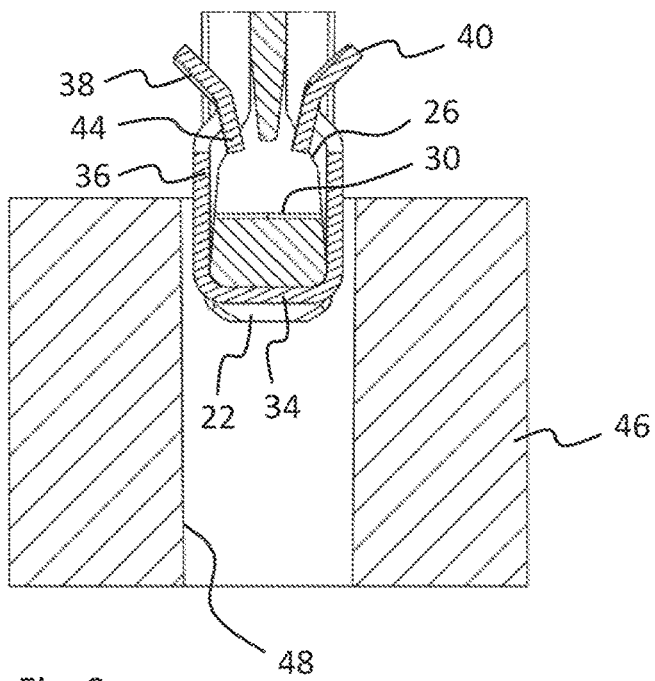
FIG. 9 shows a sectional illustration, in the form of a detail, of the fastening system according to the invention shown in FIGS. 6 to 8 along the section line B-B in FIG. 7 in a first mounting state.
Figure 10:
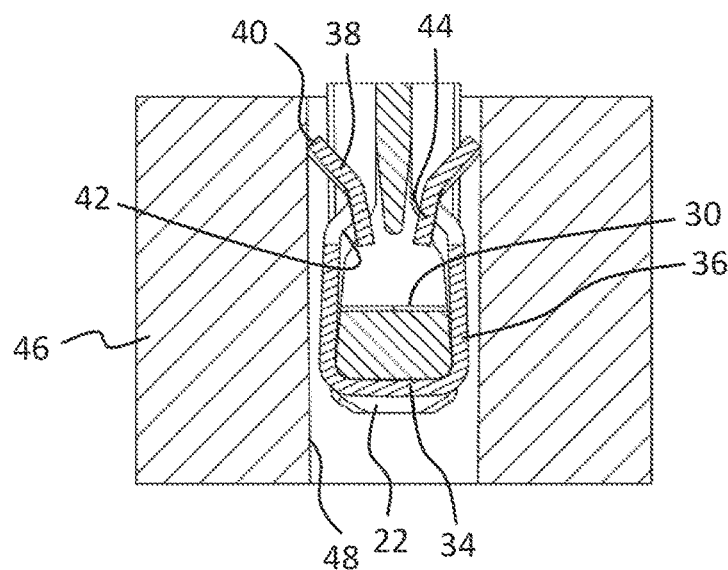
FIG. 10 shows the illustration from FIG. 9 in a second mounting state.
Figure 11:
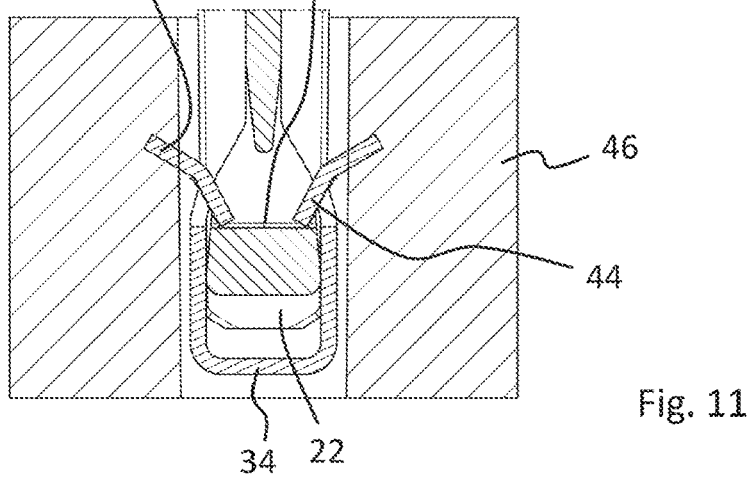
FIG. 11 shows the illustration from FIG. 9 in a third mounting state.

The mounting on a carrier component is to be explained in more detail with reference to FIGS. 9 to 11. The carrier component is shown there by the reference sign 46. The carrier component 46 can be, for example, a carrier component of a vehicle, such as a passenger car or truck, for example a body component. The carrier component 46 has a receptacle 48 which is circular cylindrical in the example represented and which can take the form of a blind hole. It does not have to have an internal thread or some other type of latching structure. In FIG. 9, the fastening system, which, for reasons of clarity, is shown only in the form of a detail below the head portion 14 of the fastening element 10, is situated in the state in which it is partially inserted into the receptacle 48. If the fastening system from FIG. 9 is inserted further axially into the receptacle 48, as shown in FIG. 10, the retaining edges 40 come into engagement with the inner surface of the receptacle 48. In particular, the cross section formed by the retaining edges 40 is somewhat larger than the diameter of the receptacle 48. It can be seen in FIGS. 9 and 10 that the clip element 32 is situated in the axial direction in a state in which it is pushed by its maximum onto the guide portion 12 (in the upward direction in FIG. 9). This maximum pushed-on state is limited by an abutment of the inner side of the connecting portion 34 against the free end of the guide portion 12. The clip element 32 is laterally received in a form-fitting manner between the wall portions 22 of the guide portion 12 by way of its clip legs.

FIG. 10 shows a state in which the system is not yet completely inserted into the receptacle 48. In the completely inserted state, the bearing portion 20 lies on the upper side of the carrier component 46. In this state of maximum insertion, the clip element 32 is situated approximately in the position shown in FIG. 11. However, FIG. 11 already shows a state in which there has been exerted on the fastening system an axial pulling force for extracting it from the receptacle 48, that is to say in the upward direction in FIG. 11. As a result, the fastening element 10 has been moved axially relative to the fixed clip element 32 by way of its guide portion 12, in the upward direction in FIG. 11. In the course of this extraction of the fastening element 10, the ramp portions 42 of the clip element 32 at first come into bearing contact with the ramp surfaces 26 of the guide portion 12. There thus occurs a spreading-out of the clip legs of the clip element 32 and consequently a (further) digging of the retaining edges 40 into the inner surface of the receptacle 48. If the fastening element 10 is now extracted further from the receptacle 48 and thus pulled off further from the clip element 32, the stop projections 44 then come into bearing contact with the stop surface 30. This state is shown in FIG. 11. This abutment reliably prevents release of the fastening element 10 from the clip element 32 still present in the receptacle 48. Moreover, the design of the stop projections 44 as an angled-off extension of the free ends 38 leads to a further increase of the force pressing the retaining edges 40 into the inner surface of the receptacle 48. Consequently, the stop projections 44 also lead to an increase of the retaining force of the fastening system in the receptacle 48.

If it is intended for the fastening system to be demounted from the receptacle 48, this can be achieved by the fastening system being rotated out. Here, the oblique orientation of the retaining edges 40 that was explained at the outset leads to a type of thread effect of the retaining edges 40 in interaction with the inner surface of the receptacle 48, with the result that the fastening system can be unscrewed as it were from the receptacle 48. A slight cutting of a thread into the inner surface of the receptacle 48 can occur here. However, this has no negative effects in terms of a subsequent remounting of the fastening system in the receptacle 48. This can again be achieved as explained at the outset by axial insertion.

Aspects of the invention include the following paragraphs.

A. A fastening system for fastening in a receptacle (48) of a carrier component (46), comprising a fastening element (10) with a guide portion (12) which can be inserted into the receptacle (48) along a direction of insertion, and comprising a clip element (32) which is plugged onto the guide portion (12) and which, to hold the fastening element (10) and clip element (32) in the receptacle (48), has retaining edges (40) which interact with an inner surface of the receptacle (48), wherein the guide portion (12) and clip element (32) have interacting latching portions by means of which the clip element (32) is held against the guide portion (12) in a latching manner, and wherein the latching portions are formed in such a way that an axial pulling force to release the fastening element (10) and clip element (32) from the receptacle (48) produces a radially outwardly acting force on the retaining edges (40) of the clip element (32), characterized in that the fastening element (10) and clip element (32) further have interacting stop portions which counteract release of the clip element (32) from the fastening element (10).

B. The fastening system as defined in para. A above, characterized in that the fastening element (10) has, as latching portions, at least two ramp surfaces (26) which are formed on opposite outer surfaces of the guide portion (12) and which each extend obliquely outward as seen in the direction of insertion into the receptacle (48).

C. The fastening system as defined in either of the preceding paragraphs, characterized in that the clip element (32) has at least two clip legs which are connected to one another by a connecting portion (34) and of which the free ends (38) form the retaining edges (40).

D. The fastening system as defined in para. C, characterized in that the free ends (38) of the clip legs extend obliquely outward as seen counter to the direction of insertion into the receptacle (48).

E. The fastening system as defined in either of paragraphs C or D, characterized in that the retaining edges (40) each extend obliquely to a plane which is perpendicular to a longitudinal axis of the guide portion (12).

F. The fastening system as defined in one of paragraph C to E, characterized in that the clip legs are each received between two wall portions (22) of the guide portion (12).

G. The fastening system as defined in paragraph B and one of paragraphs C to E, characterized in that the clip legs have, as latching portions, in each case at least one ramp portion (42) which is arranged between the free end (38) of said clip legs and the connecting portion (34) and extends obliquely outward as seen in the direction of insertion into the receptacle (48), wherein the ramp portions (42) of the clip legs interact with the ramp surfaces (26) of the guide portion (12).

H. The fastening system as defined in one of paragraphs C to G, characterized in that the clip legs of the clip element (32) comprise, as stop portions, in each case at least one stop projection (44) which extends in the direction of the connecting portion (34), and in that the guide portion (12) has at least one stop surface (30) with which the stop projections of the clip legs interact.

I. The fastening system as defined in paragraph H, characterized in that the at least one stop surface (30) lies in a plane which is substantially perpendicular to the longitudinal axis of the guide portion (12).

J. The fastening system as defined in one of paragraphs A to I, characterized in that the clip element (32) is held in an axially movable manner on the guide portion (12), wherein, upon exertion of an axial pulling force to release the fastening element (10) and clip element (32) from the receptacle (48), at first the interacting latching portions come into engagement with one another before the interacting stop portions come into engagement with one another.

K. The fastening system as defined in one of paragraphs A to J, characterized in that the fastening element (10) has, adjoining the guide portion (12), a head portion (14) with a retaining portion (16) for retaining at least one object to be fastened on the carrier component (46).

L. The fastening system as defined in one of paragraphs A to K, characterized in that the fastening element (10) consists of a plastic, produced preferably in a plastic injection molding process.

M. The fastening system as defined in one of paragraphs A to L, characterized in that the clip element (32) consists of a metal material, preferably in that the clip element (32) is a metal stamped and bent part.

LIST OF REFERENCE SIGNS

10 Fastening element
12 Guide portion
14 Head portion
16 Retaining portion
18 Through-openings
20 Bearing portion
22 Wall portions
24 Recess
26 Ramp surfaces
28 Cutout
30 Stop surface
32 Clip element
34 Connecting portion
36 Lateral legs
38 Free ends
40 Retaining edges
42 Ramp portions
44 Stop projection
46 Carrier component
48 Receptacle

What is claimed is:

1. A fastening system for fastening in a receptacle of a carrier component, comprising a fastening element with a guide portion which can be inserted into the receptacle along a direction of insertion, and comprising a clip element which is plugged onto the guide portion and which, to hold the fastening element and clip element in the receptacle, has retaining edges which interact with an inner surface of the receptacle, wherein the guide portion and clip element have interacting latching portions by means of which the clip element is held against the guide portion in a latching manner, and wherein the latching portions are formed in such a way that an axial pulling force to release the fastening element and clip element from the receptacle causes the latching portions to interact during axial movement of the fastening element away from the clip element so as to produce a radially outwardly acting force on the retaining edges of the clip element, wherein the fastening element and clip element further have interacting stop portions which counteract release of the clip element from the fastening element and the axial movement of the fastening element away from the clip element occurs prior to engagement of the interacting stop portions.

2. The fastening system as claimed in claim 1, wherein the latching portions of the guide portion comprise at least two ramp surfaces which are formed on opposite outer surfaces of the guide portion and which each extend obliquely outward as seen in the direction of insertion into the receptacle.

3. The fastening system as claimed in claim 2, wherein the clip element has at least two clip legs which are connected to one another by a connecting portion, wherein the retaining edges are formed by free ends of the clip legs.

4. The fastening system as claimed in claim 3, wherein the free ends of the clip legs extend obliquely outward as seen counter to the direction of insertion into the receptacle.

5. The fastening system as claimed in claim 3, wherein the retaining edges each extend obliquely to a plane which is perpendicular to a longitudinal axis of the guide portion.

6. The fastening system as claimed in claim 3, wherein the clip legs are each received between two wall portions of the guide portion.

7. The fastening system as claimed in claim 3, wherein the latching portions of the clip element are formed by at least one ramp portion on each clip leg, wherein the ramp portion of each clip leg is arranged between the free end and the connecting portion and extends obliquely outward as seen in the direction of insertion into the receptacle, wherein the ramp portions of the clip legs interact with the ramp surfaces of the guide portion.

8. The fastening system as claimed in claim 3, wherein the clip legs of the clip element comprise, as said stop portions, in each case at least one stop projection which extends in a direction toward the connecting portion, and in that the guide portion has at least one stop surface with which the stop projections of the clip legs interact.

9. The fastening system as claimed in claim 8, wherein the at least one stop surface lies in a plane which is substantially perpendicular to a longitudinal axis of the guide portion.

10. The fastening system as claimed in claim 1, wherein the clip element is held in an axially movable manner on the guide portion, wherein, upon exertion of an axial pulling force to release the fastening element and clip element from the receptacle, at first the interacting latching portions come into engagement with one another before the interacting stop portions come into engagement with one another.

11. The fastening system as claimed in claim 1, wherein the fastening element has, adjoining the guide portion, a head portion with a retaining portion for retaining at least one object to be fastened on the carrier component.

12. The fastening system as claimed in claim 1, wherein the fastening element consists of a plastic, produced preferably in a plastic injection-molding process.

13. The fastening system as claimed in claim 1, wherein the clip element consists of a metal material, preferably in that the clip element is a metal stamped and bent part.

14. A fastening system for fastening in a receptacle of a carrier component, comprising a fastening element with an elongated guide portion insertable into the receptacle along an insertion direction, a clip element plugged onto the guide portion and having first and second retaining edges for holding the fastening element and clip element in the receptacle by the first and second retaining edges interacting with an inner surface of the receptacle, wherein the guide portion and clip element have interacting latching portions for holding the clip element against the guide portion in a latching manner, and wherein the latching portions are formed such that an axial pulling force, applied to the fastening element in a direction opposite the insertion direction, to release the fastening element and clip element from the receptacle causes axial movement of the fastening element away from to the clip element such that the latching portions of the guide portion and the clip element interact to produce a radially outwardly acting force on the first and second retaining edges of the clip element, wherein the fastening element and clip element further have interacting stop portions which counteract release of the clip element from the fastening element and the axial movement of the fastening element away from the clip element occurs prior to engagement of the interacting stop portions.

15. The fastening system as claimed in claim 14, wherein the latching portions of the guide portion comprise first and second ramp surfaces formed on opposite outer surface portions of the guide portion, each ramp surface extending obliquely outward as seen in the insertion direction.

16. The fastening system as claimed in claim 15, wherein the clip element has first and second clip legs connected to one another by a connecting portion, wherein a free end of the first clip leg forms the first retaining edge and a free end of the second clip leg forms the second the retaining edge.

17. The fastening system as claimed in claim 16, wherein the free end of the first clip leg and the free end of the second clip leg each extend obliquely outward as seen in the direction opposite the insertion direction.

* * * * *